(12) United States Patent
Nasu

(10) Patent No.: US 11,454,373 B2
(45) Date of Patent: Sep. 27, 2022

(54) ILLUMINATION DEVICE

(71) Applicant: TOYO DENSO KABUSHIKI KAISHA, Tokyo (JP)

(72) Inventor: Kenjiro Nasu, Tsurugashima (JP)

(73) Assignee: TOYO DENSO KABUSHIKI KAISHA, Tokyo (JP)

(*) Notice: Subject to any disclaimer, the term of this patent is extended or adjusted under 35 U.S.C. 154(b) by 0 days.

(21) Appl. No.: 17/586,907

(22) Filed: Jan. 28, 2022

(65) Prior Publication Data

US 2022/0260235 A1    Aug. 18, 2022

(30) Foreign Application Priority Data

Feb. 16, 2021  (JP) .............................. JP2021-022500

(51) Int. Cl.
*F21V 9/30*    (2018.01)
*F21V 8/00*    (2006.01)
*G02B 6/00*    (2006.01)

(52) U.S. Cl.
CPC . *F21V 9/30* (2018.02); *G02B 6/00* (2013.01)

(58) Field of Classification Search
CPC ............................... F21V 9/30; G02B 6/0011
See application file for complete search history.

(56) References Cited

U.S. PATENT DOCUMENTS

2011/0037926 A1* 2/2011 Tsukahara ......... G02F 1/133603
362/293

FOREIGN PATENT DOCUMENTS

JP    2000-106049 A    4/2000
JP    5418762 B2    2/2014

* cited by examiner

*Primary Examiner* — Mary Ellen Bowman
(74) *Attorney, Agent, or Firm* — Keating and Bennett, LLP

(57) ABSTRACT

An illumination device suppresses a variation in color tone caused by a difference in optical path length from a light source without requiring a complicated manufacturing process. The illumination device includes: a single light source emitting monochromatic light; a light guide body transmitting the light emitted from the light source; a plurality of light emitting portions provided at positions having different optical path lengths from the light source, respectively, to transmit the light; and color conversion layers disposed between the light emitting portions and the light guide body to convert a color of the light transmitted through the light guide body.

16 Claims, 2 Drawing Sheets

_(54) ILLUMINATION DEVICE_

ILLUMINATION DEVICE

BACKGROUND OF THE INVENTION

Field of the Invention

The present invention relates to an illumination device that emits light emitted from a light source.

Description of the Related Art

In some illumination devices applied to vehicles and the like, light emitted from a light source is emitted through a light emitting portion. In an illumination device having a plurality of light emitting portions, for example, light is transmitted through a light guide body and emitted from each of the light emitting portions. However, the color tone of the light varies depending on an optical path length from the light source because the light is irregularly reflected in the light guide body. For example, in a case where white light is emitted from the light source, a light emitting portion farther away from the light source emits more reddish light. In this regard, in the technology described in Japanese Laid-open Patent Publication (Kokai) No. 2000-106049, a color adjustment layer is provided independently for each light emitting portion for adjustment to a certain color.

However, in the technology described in Japanese Laid-open Patent Publication (Kokai) No. 2000-106049, the color adjustment layers are required, and furthermore, it may be necessary that some of the color adjustment layers be multilayered to adjust respective color tones of light from the light emitting portions. In addition, if it is desired that the light emitting portions emit light in the same color tone, it may be necessary to configure the color adjustment layers differently from each other in order to appropriately adjust a color tone for each light emitting portion. Therefore, since the color tone is desirably adjusted depending on a light emission position, the number of parts increases and the number of times of coating increases, resulting in a problem that a manufacturing process is complicated.

It should be noted that Japanese Patent No. 5418762 discloses a technology in which blue light is converted into white light by a phosphor sheet including a fluorescent material.

SUMMARY OF THE INVENTION

The present invention provides an illumination device suppressing a variation in color tone caused by a difference in optical path length from a light source without requiring a complicated manufacturing process.

According to an aspect of the present invention, there is provided an illumination device including: a single light source emitting monochromatic light; a light guide body transmitting the light emitted from the light source; a plurality of light emitting portions provided at positions having different optical path lengths from the light source, respectively, to transmit the light; and color conversion layers disposed between the light emitting portions and the light guide body to convert a color of the light transmitted through the light guide body.

According to the present technology, it is possible to suppress a variation in color tone caused by a difference in optical path length from the light source without requiring a complicated manufacturing process.

Further features of the present invention will become apparent from the following description of exemplary embodiments with reference to the attached drawings.

DESCRIPTION OF THE EMBODIMENTS

Hereinafter, embodiments of the present technology will be described with reference to the drawings.

First Embodiment

Figure 1:
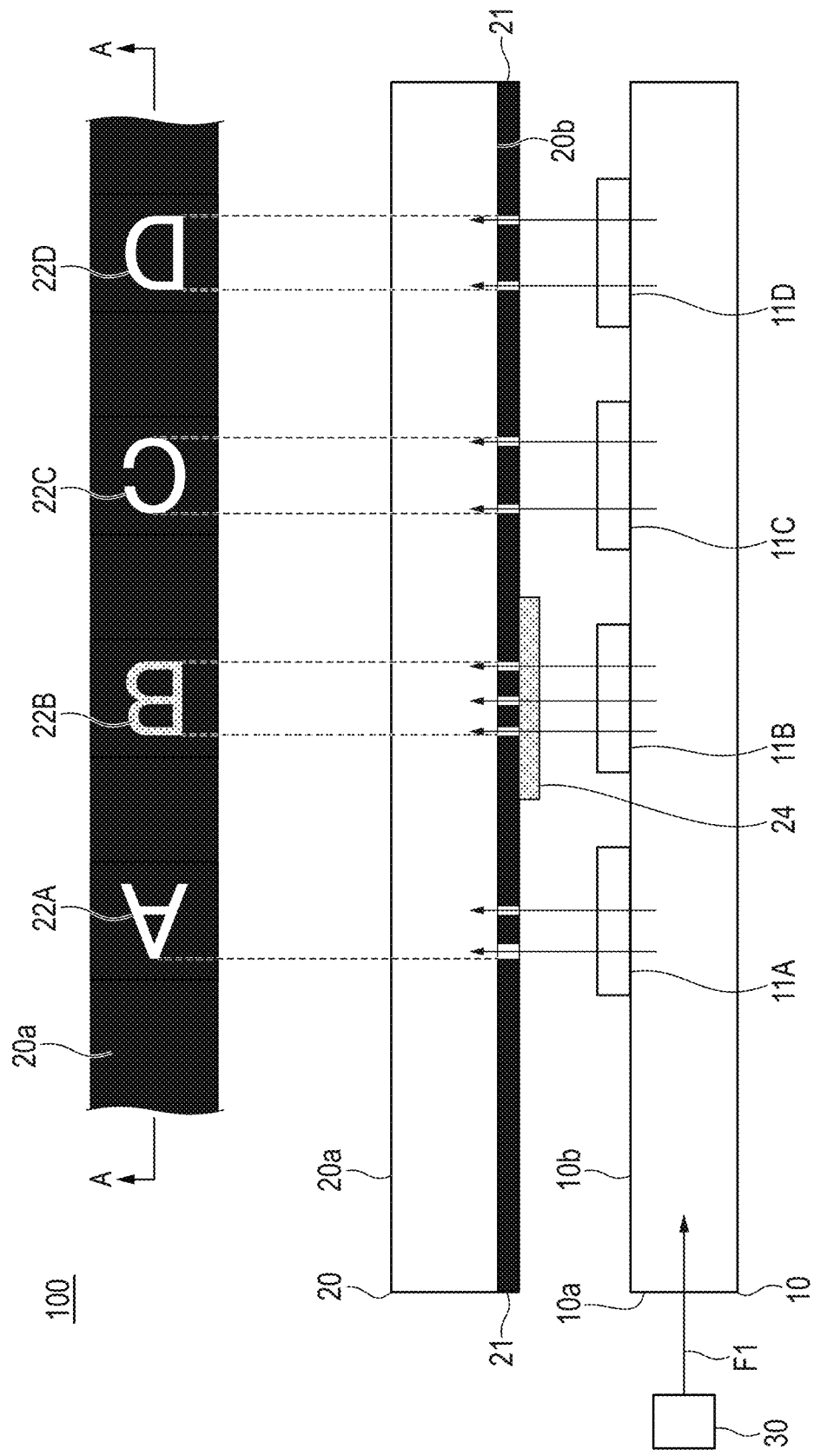
FIG. 1 is a schematic diagram of an illumination device according to a first embodiment of the present invention.

FIG. 1 is a schematic diagram of an illumination device according to a first embodiment of the present invention. As an example, the illumination device 100 is applied to a display panel that displays a shift position of a shift lever of a vehicle, but it is not limited where the illumination device 100 is applied. The illumination device 100 mainly includes a single light source 30, a light guide body 10 transmitting light emitted from the light source 30, and a panel member 20. FIG. 1 shows a cross-sectional view of the illumination device 100 taken along line A-A together with a top view showing an upper surface 20a of the panel member 20.

Both the light guide body 10 and the panel member 20 have an elongated rectangular parallelepiped shape. The light guide body 10 and the panel member 20 are disposed to face each other in a common longitudinal direction. A housing (not shown) on which each member of the illumination device 100 is mounted is fixed to the vehicle. The light guide body 10 is fixed to the housing. The panel member 20 is fixed to the light guide body 10 or the housing. The light guide body 10 has a light incident surface 10a into which the light emitted from the light source 30 enters, and a light emitting surface 10b that is an upper surface from which the light that has entered is emitted. It should be noted that a surface on which the light emitting surface 10b is provided is not limited to the upper surface. In addition, the other surfaces (a lower surface, longitudinal end surfaces, side surfaces, and the like) of the light guide body 10 may be shielded not to leak light, or may be treated to absorb light.

Both the light guide body 10 and the panel member 20 are made of a colorless transparent resin or the like, but it is not essential that they are colorless, and they may be made of a cloudy resin. The light emitting surface 10b of the light guide body 10 faces a lower surface 20b of the panel member 20. The lower surface 20b of the panel member 20 is a light incident surface into which the light from the light guide body 10 enters. The light emitting surface 10b of the light guide body 10 is provided with a plurality of color conversion layers 11A to 11D. The upper surface 20a of the panel member 20 is a light emitting surface from which the light that has entered from the light guide body 10 is emitted. It should be noted that the other surfaces (longitudinal end surfaces, side surfaces, and the like) of the panel member 20 may be shielded not to leak light, or may be treated to absorb light.

A black layer 21 is provided on the lower surface 20b of the panel member 20. The black layer 21 is formed by, for example, coating. A plurality of light emitting portions 22A to 22D capable of transmitting light are formed by partially removing the black layer 21 through laser processing or the like or by forming a certain shape through masking using a printing plate. For example, by removing the black layer 21 in such a manner as to take out shapes such as letters and numbers, portions where the black layer 21 is absent become the light emitting portions 22A to 22D. Although marks such as "A, B, C, and D" are exemplified as the shapes of the plurality of light emitting portions 22A to 22D, the shape in which the black layer 21 is removed is not limited, and may be a simple geometric shape. It should be noted that, in the present technology, the coating includes coating and printing.

The panel member 20 is also provided with a second color conversion layer 24 to cover the light emitting portion 22B from below. The second color conversion layer 24 is formed by, for example, printing. The second color conversion layer 24 may be multilayered by multiple times of processing. It should be noted that the second color conversion layer 24 may be formed by coating instead of printing, or may be provided by fixing a color-convertible material formed in a sheet shape in advance by adhesion or the like. In an example shown in FIG. 1, the second color conversion layer 24 is disposed between the light emitting portion 22B and the color conversion layer 11B. It should be noted that the second color conversion layer 24 is not necessarily provided, and may be provided for one or all of the light emitting portions 22A to 22D. The function of the second color conversion layer 24 will be described later.

Only one light source 30 is provided. The light source 30 includes an LED or the like that emits monochromatic light. For example, the light source 30 emits blue light. The light source 30 emits light in direction F1 in the drawings. The direction F1 is substantially parallel to the longitudinal directions of the light guide body 10 and the panel member 20.

The color conversion layers 11A to 11D on the light guide body 10 are disposed between the light emitting portions 22A to 22D and the light guide body 10. The color conversion layers 11A to 11D are disposed to correspond to the light emitting portions 22A to 22D, respectively. The color conversion layers 11A to 11D are disposed at positions corresponding to the light emitting portions 22A to 22D at respective optical path lengths from the light source 30 (distances in the direction F1, that is, a direction to be far away from the light source 30). Therefore, the light emitting portions 22A to 22D are provided at positions having different optical path lengths from the light source 30 in the direction F1. The color conversion layers 11A to 11D are also provided at positions having different optical path lengths from the light source 30 in the direction F1.

The color conversion layers 11A to 11D are, for example, phosphor sheets including a fluorescent material. As the phosphor constituting the color conversion layers 11A to 11D, an yttrium aluminum garnet (YAG)-based phosphor is adopted, but another type of phosphor may be adopted.

The light emitted from the light source 30 enters the light guide body 10 from the light incident surface 10a, is internally reflected in the light guide body 10, and is emitted from the light emitting surface 10b. It should be noted that a reflecting surface that is not parallel to the longitudinal direction may be provided on the side surface or the lower surface of the light guide body 10.

The light emitted from the light emitting surface 10b and transmitted through the color conversion layers 11A to 11D enters the panel member 20 from lower surfaces of the light emitting portions 22A to 22D, is transmitted through the panel member 20, and is emitted from upper surfaces of the light emitting portions 22A to 22D. In practice, since the portions having shapes of marks A, B, C, and D mainly transmit light, each of the marks is visually recognized brightly when viewed from above the upper surface 20a.

Here, the color conversion layers 11A to 11D convert a color of the light transmitted through the light guide body 10. Therefore, the color of the light transmitted through the light guide body 10 is converted, by the color conversion layers 11A to 11D, into a color (e.g., white, yellow, green, or the like) different from the color (e.g., blue, red, or the like) of the light emitted by the light source 30. If non-monochromatic light enters the light guide body 10, a difference occurs in attenuation due to a difference in wavelength, and thus emitted light varies in color depending on a position. For example, if white light enters the light guide body 10, emitted light becomes more reddish at a position farther away from the light source 30. However, in the present embodiment, since monochromatic (blue) light enters, colors of the light transmitted through color conversion layers 11A to 11D are substantially identical.

Among the light emitting portions 22A to 22D, in a light emitting portion where the second color conversion layer 24 is provided, the light transmitted through the second color conversion layer 24 is emitted. In the example shown in FIG. 1, light transmitted through the color conversion layer 11B is transmitted through the second color conversion layer 24 and enters the panel member 20. The second color conversion layer 24 converts a color of the light transmitted through the color conversion layer 11B corresponding thereto. Therefore, the light transmitted through the second color conversion layer 24 is adjusted to a desired color and emitted to the outside from the upper surface 20a. By providing the second color conversion layer 24, a color tone of a color of emitted light can be adjusted as desired for each light emitting portion. In the example shown in FIG. 1, among the light emitting portions 22A to 22D, only the light emitting portion 22B (mark B) can emit light in a clearly different color tone from the others. It should be noted that the second color conversion layer 24 can also adjust a shade of a similar color.

According to the present embodiment, the light emitting portions 22A to 22D are provided at positions having different optical path lengths from the light source 30. Monochromatic light emitted from the single light source 30 is transmitted through the light guide body 10, a color of the light is converted by the color conversion layers 11A to 11D, and the light is emitted from the light emitting portions 22A to 22D. Since the light source 30 emits monochromatic light, a difference in color tone due to attenuation at a specific wavelength depending on a light emission position hardly occurs. Therefore, a manufacturing process is simplified because it is not essential to provide a second color conversion layer 24 to correspond to each of the light emitting portions, provide second color conversion layers 24 having different configurations, or multiply coat the second color conversion layers 24, in order to adjust a color tone of visually recognized light. Therefore, it is possible to suppress a variation in color tone caused by a difference in optical path length from the light source without requiring a complicated manufacturing process. It should be noted that when it is desired to make colors of light emitted from the light emitting portions 22A to 22D identical, it is also easy to make the configurations of the color conversion layers 11A to 11D identical or similar.

Second Embodiment

Figure 2:
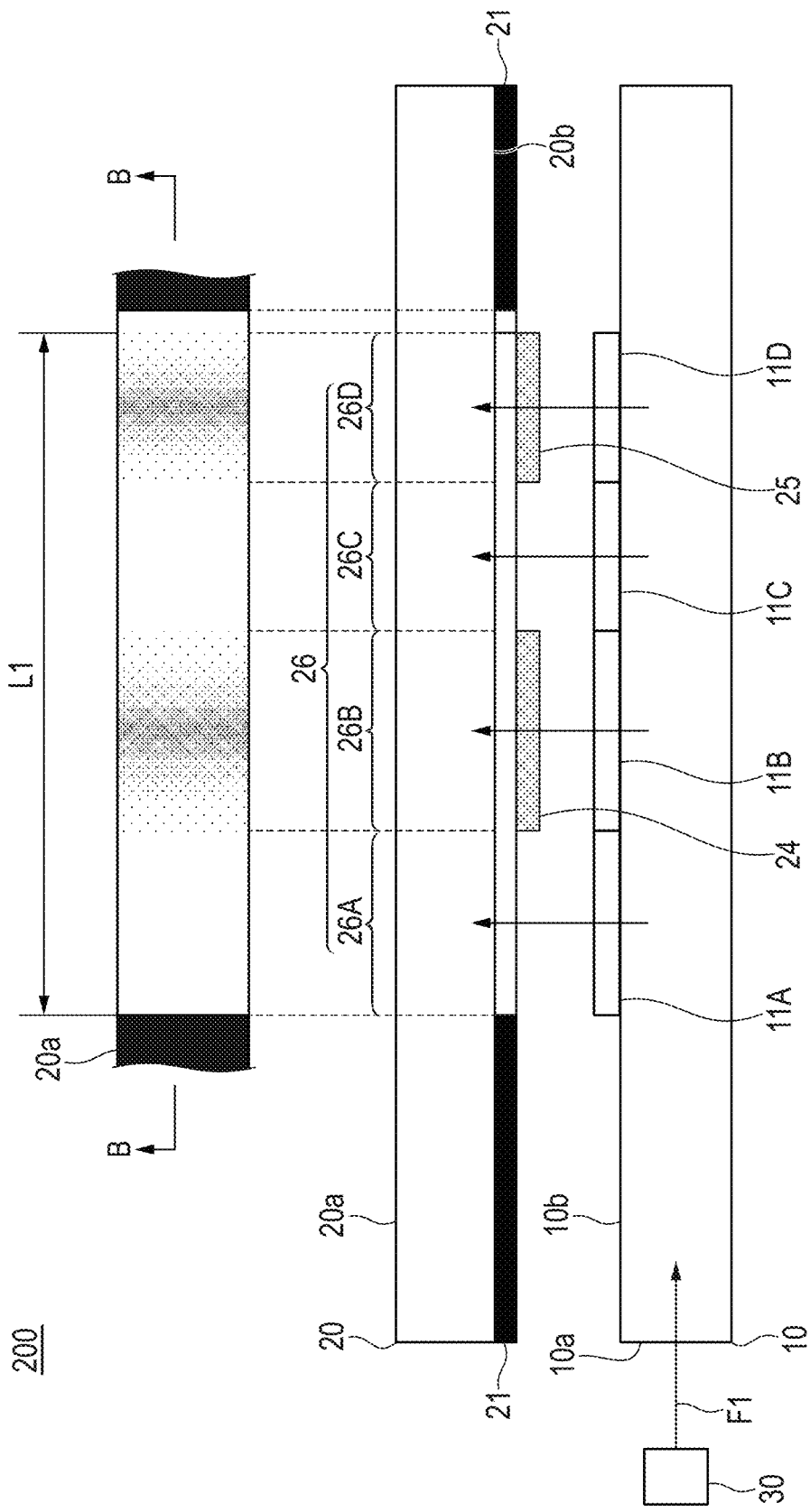
FIG. 2 is a schematic diagram of an illumination device according to a second embodiment of the present invention.

FIG. 2 is a schematic diagram of an illumination device according to a second embodiment of the present technology. FIG. 2 shows a cross-sectional view of an illumination device 200 taken along line B-B together with a top view showing an upper surface 20a of a panel member 20. The basic configuration of the illumination device 200 is similar to that in the first embodiment. However, a method of providing a black layer and a second color conversion layer on the panel member 20, a method of providing a color conversion layer on a light guide body 10, and the like are different from those in the first embodiment. The differences of the second embodiment from the first embodiment will be mainly described. The configuration of the light source 30 is the same as that in the first embodiment.

In the panel member 20, a range used for presenting main information to a user is range L1. The range L1 is a predetermined range for an optical path length from the light source 30 in direction F1. A plurality of regions continuously provided over the range L1 in the panel member 20 constitute a continuous light emitting portion 26. The continuous light emitting portion 26 includes a plurality of continuous light emitting portions 26A to 26D. The light emitting portions 26A to 26D are also light emission positions having different optical path lengths from the light source 30. The color conversion layers 11A to 11D are disposed to correspond to the light emitting portions 26A to 26D, respectively.

The panel member 20 is provided with second color conversion layers 24 and 25 to cover the light emitting portions 26B and 26D from below, respectively. In an example shown in FIG. 2, the second color conversion layer 24 is disposed between the light emitting portion 26B and the color conversion layer 11B, and the second color conversion layer 25 is disposed between the light emitting portion 26D and the color conversion layer 11D. It should be noted that the second color conversion layer is not necessarily provided, and the second color conversion layer may be provided for one or all of the light emitting portions 26A to 26D. The basic configuration of the second color conversion layer 25 is the same as that of the second color conversion layer 24, but the second color conversion layers 24 and 25 may have different configurations according to desired color tones.

In the example shown in FIG. 2, there is no clear boundary between adjacent ones of the light emitting portions 26A to 26D. However, color tones vary depending on whether the second color conversion layers 24 and 25 are present or absent. For example, the light emitting portions 26B and 26D can emit light in a different color from the light emitting portions 26A and 26C. It should be noted that, similarly to the first embodiment, a mark as exemplified in FIG. 1 may be provided in one or all of the light emitting portions 26A to 26D.

According to the present embodiment, it is possible to achieve the same effect as that of the first embodiment by suppressing a variation in color tone caused by a difference in optical path length from the light source without requiring a complicated manufacturing process.

It should be noted that, in each of the above-described embodiments, the color conversion layers 11A to 11D may contain a phosphor in the same amount (wt %). However, a certain color conversion layer may contain a phosphor in a different amount.

For example, in the first and second embodiments, a color conversion layer disposed at a position having a greater optical path length from the light source 30 may be configured to contain a phosphor in a larger amount. For example, the color conversion layer 11D contains the phosphor in the largest amount in order of 11A<11B<11C<11D. By appropriately adjusting phosphor contents, it is easy to make the light emitting portions 22A to 22D or the light emitting portions 26A to 26D to have a uniform luminance.

Alternatively, a specific color conversion layer (or corresponding to a specific light emission position) may contain a phosphor in a different amount from the other color conversion layers (or corresponding to other light emission positions). In this way, some light emitting portions (or light emission positions) can have a different luminance from the other light emitting portions (or light emission positions).

It should be noted that, in each of the above-described embodiments, the number of light emitting portions and the number of color conversion layers are not limited to four. The number of light emitting portions may be at least two. In addition, the color conversion layers 11A to 11D are not necessarily configured separately, and one or more integral color conversion layers may be provided. In this case, one color conversion layer corresponds to a plurality of light emitting portions.

It should be noted that, in each of the above-described embodiments, the color of light emitted from the light source 30 only needs to be monochromatic. Therefore, the light emitted from the light source 30 may be not only blue right but also violet light or ultraviolet light. Alternatively, the color of the emitted light may not be blue, and may be red or yellow.

Although the present technology has been described in detail based on the preferred embodiments thereof, the present technology is not limited to these specific embodiments, and various different forms are also included in the present technology in a range without departing from the gist of the present technology. Some of the above-described embodiments may be appropriately combined.

This application claims the benefit of Japanese Patent Application No. 2021-022500 filed on Feb. 16, 2021 which is hereby incorporated by reference herein in its entirety.

What is claimed is:

1. An illumination device comprising:
a single light source emitting monochromatic light;
a light guide body transmitting the light emitted from the light source;
a plurality of light emitting portions provided at positions having different optical path lengths from the light source, respectively, to transmit the light; and
color conversion layers disposed between the light emitting portions and the light guide body to convert a color of the light transmitted through the light guide body.

2. An illumination device comprising:
a single light source emitting monochromatic light;
a light guide body transmitting the light emitted from the light source;
a light emitting portion including a plurality of regions continuously provided over a predetermined range for an optical path length from the light source to transmit the light; and
color conversion layers disposed between the light emitting portion and the light guide body to convert a color of the light transmitted through the light guide body.

3. The illumination device according to claim 1, wherein the light source emits blue light.

4. The illumination device according to claim 1, wherein each of the color conversion layers converts the color of the light transmitted through the light guide body into a color different from that of the light emitted by the light source.

5. The illumination device according to claim 4, wherein each of the color conversion layers converts the color of the light transmitted through the light guide body into white.

6. The illumination device according to claim 1, wherein each of the color conversion layers contains a phosphor.

7. The illumination device according to claim 1, wherein each of the color conversion layers contains a phosphor, the color conversion layers are provided to correspond to the light emitting portions, respectively, and
a color conversion layer disposed at a position having a greater optical path length from the light source contains the phosphor in a larger amount.

8. The illumination device according to claim 1, wherein each of the color conversion layers contains a phosphor, the color conversion layers are provided to correspond to the light emitting portions, respectively, and
a specific one of the color conversion layers contains the phosphor in a different amount from the other ones of the color conversion layers.

9. The illumination device according to claim 2, wherein each of the color conversion layers contains a phosphor, the color conversion layers are provided to correspond to light emission positions having different optical path lengths from the light source, respectively, in the light emitting portion, and
a color conversion layer disposed at a position having a greater optical path length from the light source contains the phosphor in a larger amount.

10. The illumination device according to claim 2, wherein each of the color conversion layers contains a phosphor, the color conversion layers are provided to correspond to light emission positions having different optical path lengths from the light source, respectively, in the light emitting portion, and
one of the color conversion layers corresponding to a specific light emission position contains the phosphor in a different amount from the other ones of the color conversion layers corresponding to the other light emission positions.

11. The illumination device according to claim 1, further comprising
a second color conversion layer disposed between one of the light emitting portions and a corresponding one of the color conversion layers to convert a color of the light transmitted through the color conversion layer.

12. The illumination device according to claim 2, wherein the light source emits blue light.

13. The illumination device according to claim 2, wherein each of the color conversion layers converts the color of the light transmitted through the light guide body into a color different from that of the light emitted by the light source.

14. The illumination device according to claim 13, wherein
each of the color conversion layers converts the color of the light transmitted through the light guide body into white.

15. The illumination device according to claim 2, wherein each of the color conversion layers contains a phosphor.

16. The illumination device according to claim 2, further comprising
a second color conversion layer disposed between the light emitting portion and one of the color conversion layers to convert a color of the light transmitted through the color conversion layer.

* * * * *